April 9, 1935. W. T. DAVIS ET AL 1,996,905
METHOD OF AND APPARATUS FOR FORMING SLUGS FOR USE IN EXTRUSION PROCESSES
Filed Aug. 12, 1931 5 Sheets-Sheet 1

April 9, 1935. W. T. DAVIS ET AL 1,996,905
METHOD OF AND APPARATUS FOR FORMING SLUGS FOR USE IN EXTRUSION PROCESSES
Filed Aug. 12, 1931 5 Sheets-Sheet 3

INVENTOR

April 9, 1935. W. T. DAVIS ET AL 1,996,905
METHOD OF AND APPARATUS FOR FORMING SLUGS FOR USE IN EXTRUSION PROCESSES
Filed Aug. 12, 1931 5 Sheets—Sheet 4
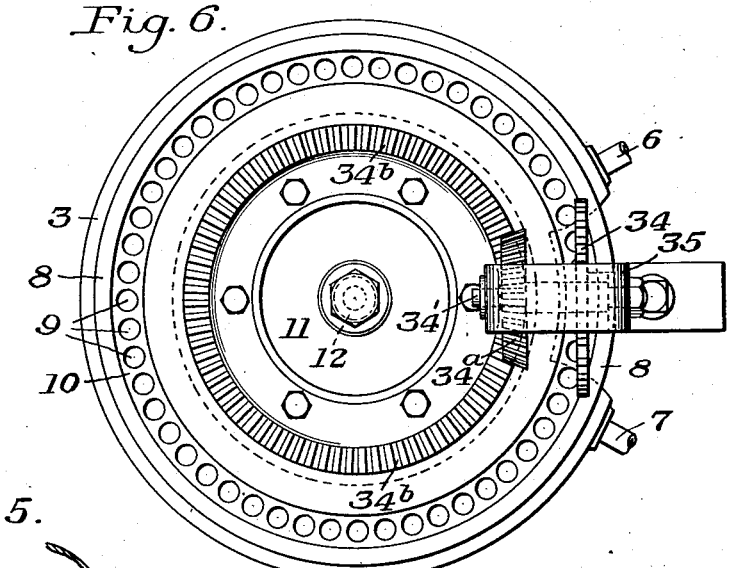
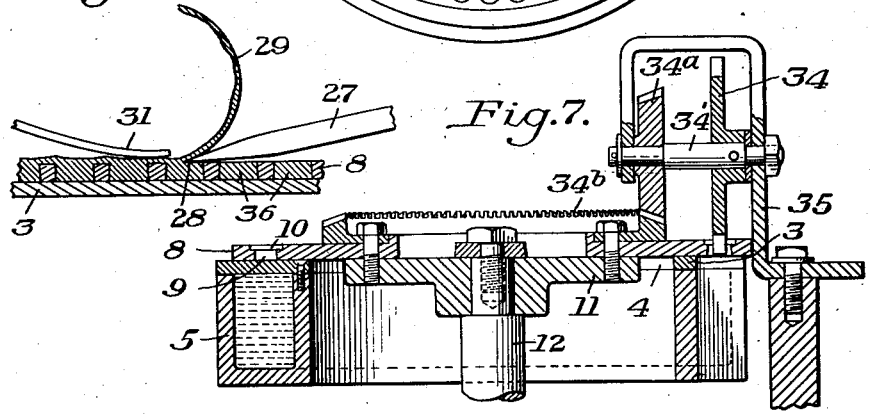
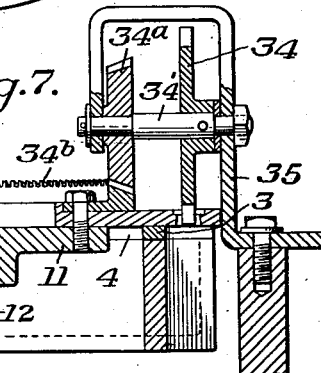
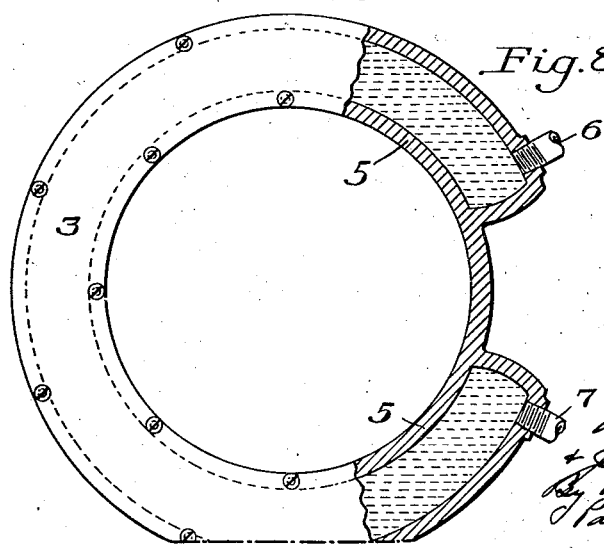

April 9, 1935. W. T. DAVIS ET AL 1,996,905
METHOD OF AND APPARATUS FOR FORMING SLUGS FOR USE IN EXTRUSION PROCESSES
Filed Aug. 12, 1931 5 Sheets-Sheet 5
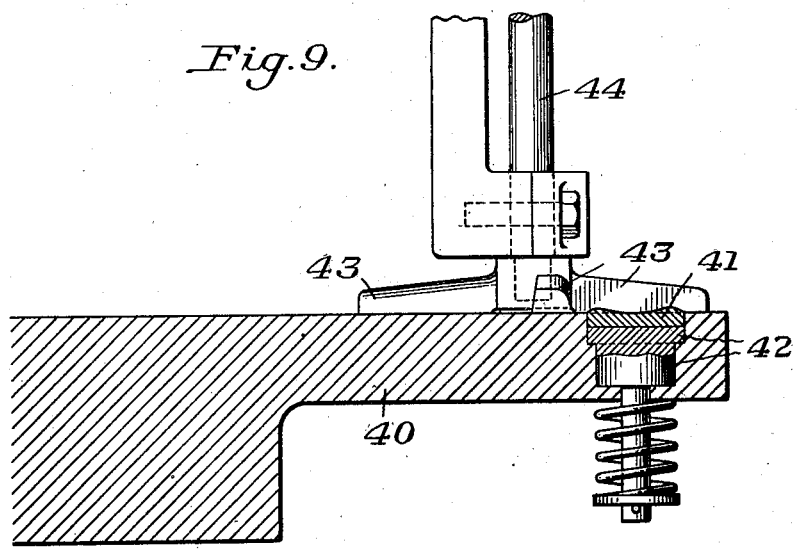
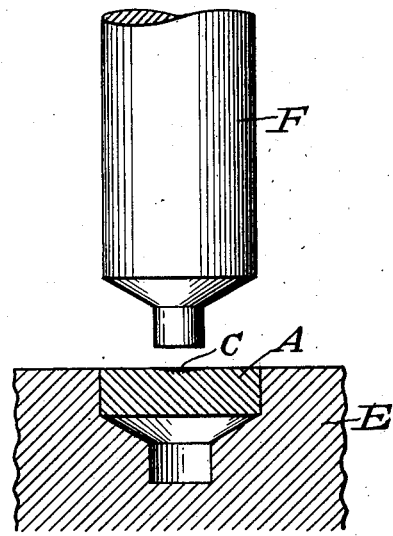
INVENTOR

UNITED STATES PATENT OFFICE 1,996,905

METHOD OF AND APPARATUS FOR FORMING SLUGS FOR USE IN EXTRUSION PROCESSES

Walter T. Davis and John A. McGinnis, Wheeling, W. Va., assignors to Wheeling Stamping Company, Wheeling, W. Va., a corporation of West Virginia Application August 12, 1931, Serial No. 556,472

9 Claims. (Cl. 29—33)

This invention relates broadly to the formation of articles, such as collapsible tubes, by extrusion processes, and more particularly to a method and apparatus for the production of nonferrous slugs or blanks from which such articles are extruded.

More particularly, the present invention is for an improvement on the method disclosed in our prior Patent No. 1,646,854, dated October 25, 1927, and assigned to the Wheeling Stamping Company.

According to our said patent, there is provided a rotary disc having an annular series of separated pockets therein and this disc is rotated in a step-by-step fashion to bring the pockets beneath a pouring valve whereby molten metal of the type used for making collapsible tubes is poured into the pockets or mold cavities. The valves employed are measuring valves, so that a predetermined amount of metal is poured into each pocket or recess. When this metal hardens it forms a circular slug or disc which is subsequently ejected from the mold. The slug or disc thus formed may thereafter be then put into an extrusion press such as that shown in our Patent No. 1,646,854, or the Davis Patent No. 1,515,383 and extruded in the customary manner to form a tube or like article. It will be understood that any type of extrusion apparatus may be used.

It is a well-known fact that molten metal of the type used for making collapsible tubes such as lead and tin readily accumulates dross. Although considerable effort has been made in practicing the invention disclosed in Patent No. 1,646,854 to reduce the formation of dross to a minimum, it nevertheless happens that each slug cast by this process has a thin film of dross over its surface. When the metal cools in the molds, the metal which is around the outside of the mold cools first. With the continued cooling of the metal further shrinkage occurs, and since the metal is solidified at the edges of the blank the shrinkage occurs at the center, so that practically every blank which is molded has the exposed or top surface slightly dished toward the center of the blank.

When the blank is extruded the extrusion plunger pushes the metal at the center of the blank downwardly to form what is subsequently the neck of a collapsible tube while the metal at the edges of the blank is extruded upwardly around the sides of the plunger to form the thin walls of the collapsible tube. Dross which accumulates at the center of the blank or button does not do any particular harm because it is forced into a part of the tube where the metal is relatively thick and not attenuated to the extent that it is in the walls of the tube. Since the dross does not have the ductility or malleability of the pure metal it constitutes an impurity, and in the thinner extruded walls of a collapsible tube it is apt to produce imperfections, such as very minute pores or holes which render the tube imperfect.

While the practice of the invention disclosed in Patent No. 1,646,854 results in a practical method of forming tubes, there is, for the reasons noted above, some slight loss by reason of the presence of dross to a greater or lesser extent on each blank.

According to the present invention we contemplate trimming the top of each blank after it has solidified either to remove a complete skin of metal from the top of each blank, or remove a skin of metal from the high portion of the top of each blank so that only the dross is either completely removed or is removed from the portion of the blank where it produces trouble in the subsequent step of extrusion.

According to the preferred method of practicing our invention, the mold cavities or recesses are filled to overflowing with molten metal and then, after the metal has solidified, the excess is cut off and the resulting blanks have a clean top surface free of dross from every portion where it is likely to cause trouble. Since the molds are filled to overflowing, we have found it convenient to use a rotary table as disclosed in our Patent No. 1,646,854, but to run it continuously instead of intermittently, as disclosed in said patent, under a valve at the bottom of the melting pot which is open all the time so that the mold cavities are filled to excess with the surplus of the metal at the top solidifying on the top of the table. A fixed knife is provided under which the table passes and this knife cuts off all of the surplus metal.

The invention may be more clearly understood by reference to the accompanying drawings in which Figure 1 represents a top plan view of an apparatus embodying our invention and for carrying out our method;

Figure 5 is a detail view showing the relative position of the cutting knife and hold down finger;

Figure 6 is a top plan view of a slight modification in which a positive drive is provided for the slug ejecting wheel;

Figure 7 is a vertical transverse section through the arrangement shown in Figure 6;

Figure 8 is a detail view showing the water-cooled table over which the casting disc moves;

Figure 9 is a view similar to Figure 3 of a slightly modified arrangement showing a different type of cutter and showing the invention applied to a table of the structure shown in Patent No. 1,646,854;

Figure 10 is a somewhat enlarged sectional view through a blank, as heretofore commonly formed in using a machine of the type shown in Patent No. 1,646,854;

Figure 11 is a similar view of the blank after it has been trimmed according to our present invention; and Figure 12 is a detail view representing diagrammatically the extrusion plunger and the manner in which the blank is positioned under the die.

Referring first to Figure 10, it will be seen how the metal freezes when it is poured into the individual mold cavities of the machine as shown in Figure 5, the outer portion of the blank being higher than the extreme edges or the central portion. In this figure the blank is designated A, and B designates the high portion, while C designates the center portion which is dished downwardly from the contraction of the metal upon solidifying from the outside toward the center. The top surface of the button A contains more or less dross, produced largely from the oxidation of the metal while it is cooling in the mold cavities.

According to the present invention, the button A is cast somewhat thicker than is required in the resulting blank. The excess metal above the line D—D is trimmed off. All of the top of the button may be removed so that the button is flat across the top, or, as shown in Figure 11, it may be trimmed so that all of the portion B is removed and only a very small part of the original skin is left at C. The presence of a small amount of dross at C is not objectionable for the reason that when the slug or blank A is put in the customary extruding die E shown in Figure 12 and subjected to pressure by the extruding plunger F the metal at the center of the blank, including the original skin at C, is forced downwardly into that part of the mold which forms the head of the collapsible tube, while it is the metal to the sides of the central portion C that is extruded upwardly around the plunger F to form the thin walls of the collapsible tube.

As previously stated, our invention contemplates either the complete removal of the top skin of the blank, or the removal of most of the top portion of the blank except the small area at C.

Figure 1:
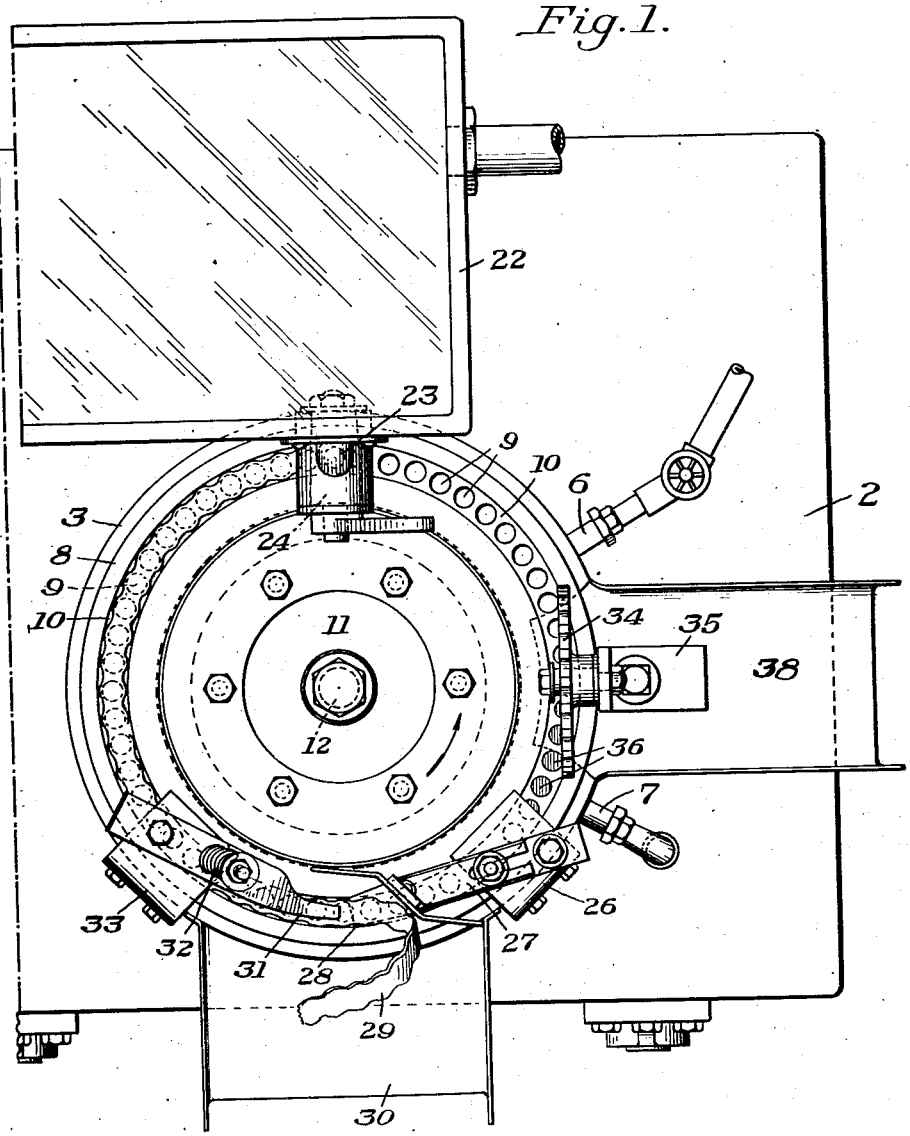
Figure 2:
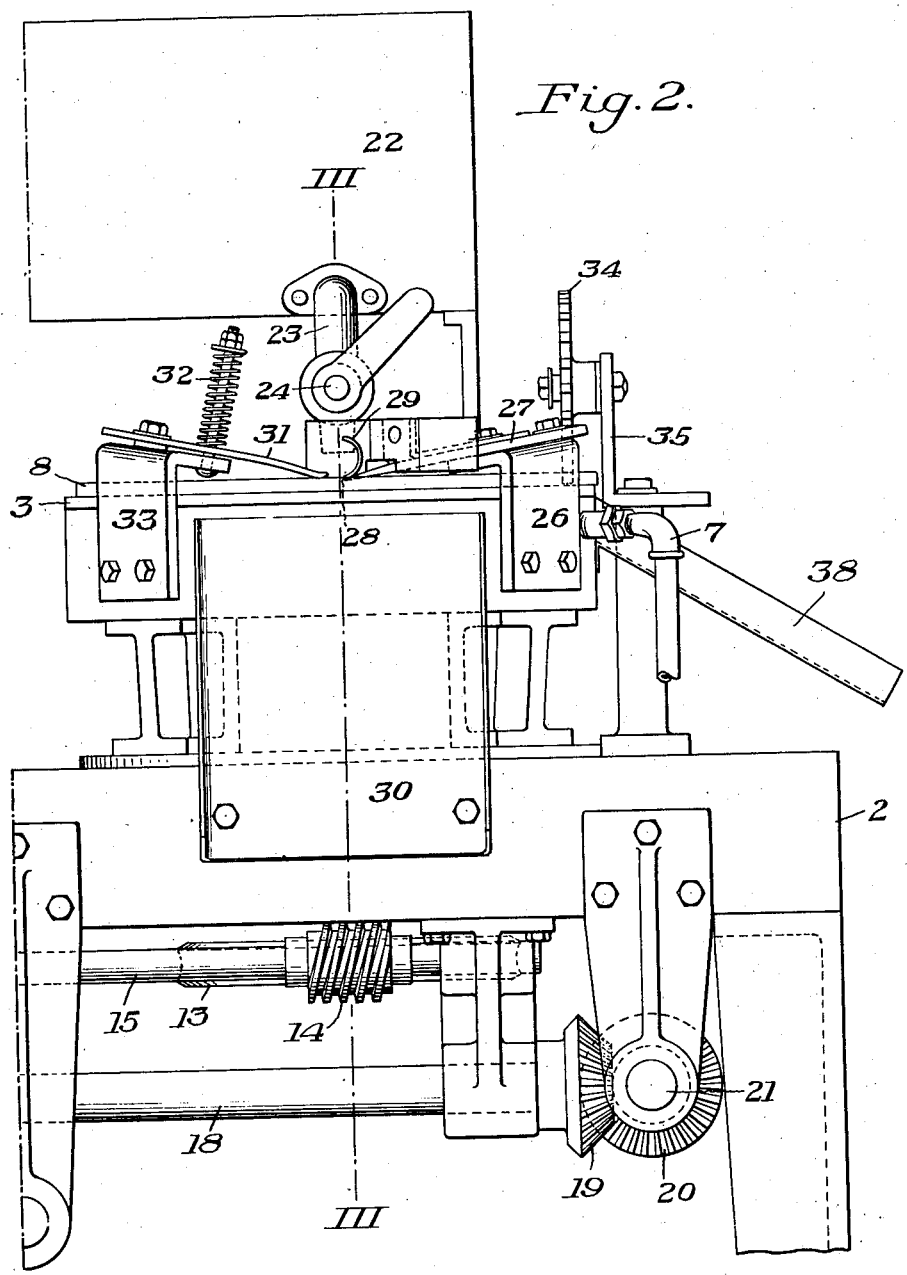
Figure 2 is a side elevation of the apparatus shown in Figure 1.
Figure 3:
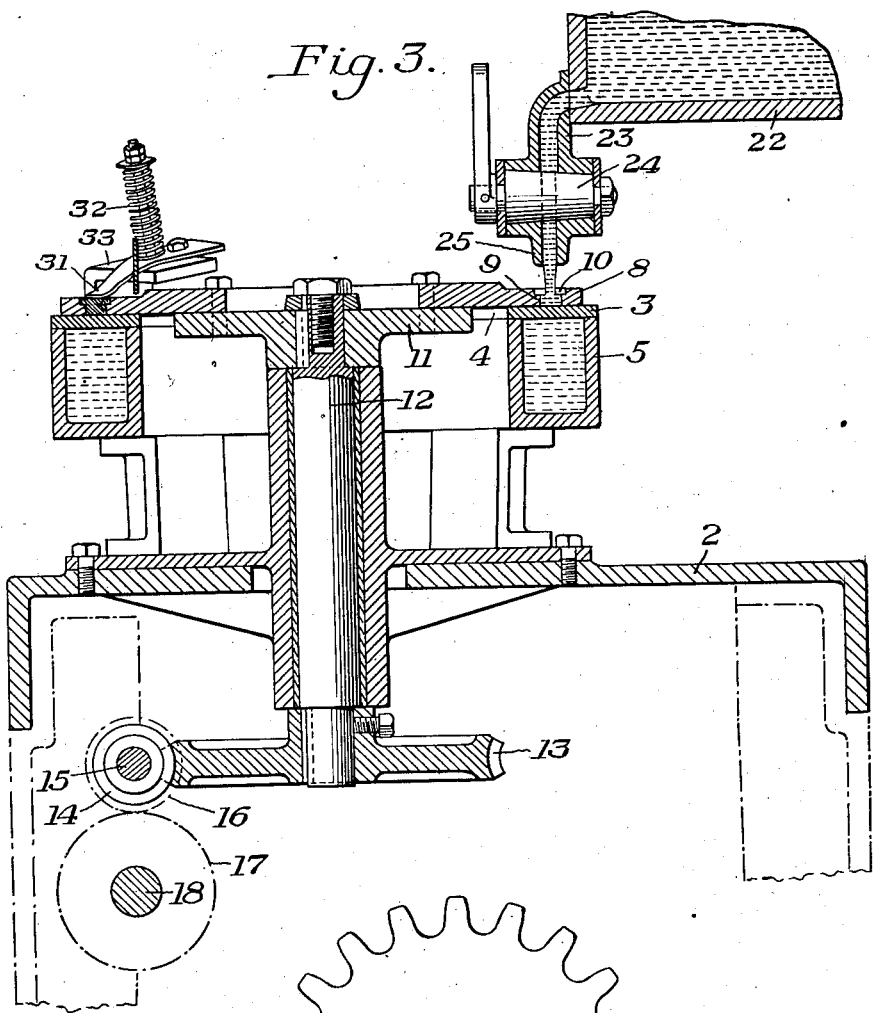
Figure 3 is a vertical section through a portion of the machine in substantially the plane of line III—III of Figure 2.
Figure 4:
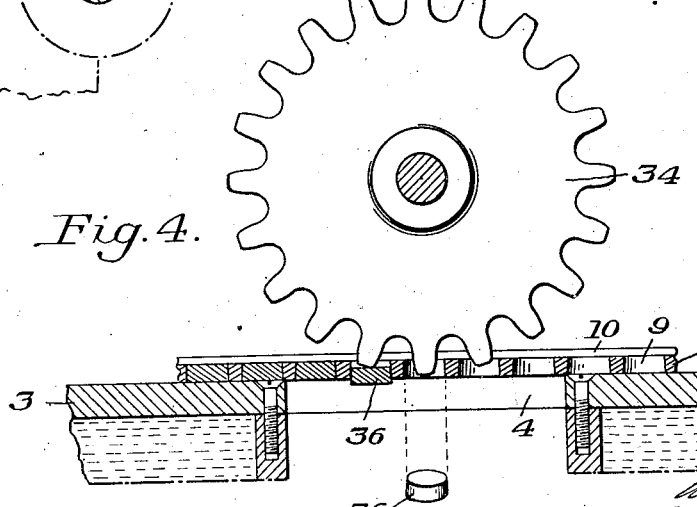
Figure 4 is a detail view of the stripping device for pushing the completed blanks out of the apparatus.

In Figures 1 to 5, inclusive, we have shown a preferred embodiment of an apparatus for practicing our invention. The machine as shown comprises a supporting structure or frame 2 above the top of which is supported a casting table 3 which is in the form of a ring having a cut-out portion 4 therein, as shown in Figure 4. Below this table is a water chamber 5 through which water may be circulated for cooling the table 3. To provide for this circulation of water there are shown in Figure 1 an inlet pipe 6 and a discharge pipe 7. Setting on the table 3 is a circular disc 8 having an annular series of holes or recesses 9 extending through it. The top of the table may be conveniently formed with a shallow channel or groove 10, with the casting recesses 9 formed in the bottom of this channel or groove. The disc 8 is secured to a base plate 11 on a vertical shaft 12. On the lower end of the shaft 12 is a worm wheel 13 which engages a worm 14 on a drive shaft 15. The drive shaft 15 may be conveniently connected with any suitable driving means. In Figures 2 and 3 we have shown the shaft 15 as being provided with a gear indicated by dotted lines at 16 meshing with another gear 17 on a shaft 18, this shaft in turn having a pinion 19 thereon meshing with a pinion 20 on a cross drive shaft 21, but this drive can obviously be simplified.

Supported above the frame 2 is a melting pot 22 in which the tin alloy or other metal used for making collapsible tubes is melted and stored. Leading from the bottom of this tank is a discharge pipe 23 having a valve 24 therein and a discharge spout 25, this discharge spout overhanging the casting table 3 and the casting disc 8 so as to discharge metal into the holes or recesses 9. The valve 24 may be adjusted to regulate the flow of metal therethrough in order that the flow of metal will be properly proportioned to the speed of rotation of the disc 8 and the number and size of the recesses 9.

In the operation of the machine the disc 8 is continuously rotated and metal pours continuously from the discharge spout 25 into the holes in the casting disc, filling them to overflowing and the excess metal freezes in the groove or channel 10. In Figure 1 the appearance of the filled recesses with the continuous irregular strip of excess metal in the groove 10 is shown, the excess metal having sinuous edges as shown.

Positioned over the casting disc 8 opposite the pouring spout 25 is a fixed bracket 26 on which is carried an inclined knife 27, this knife being sloped toward the rotating table and the cutting edge 28 of the knife bears in the groove 10, the cutting edge of the knife riding on the bottom of the groove 10. This is best shown in Figure 2. For convenience the knife 27 is made removable and adjustable as indicated.

Assuming the casting disc 8 to be rotating in an anti-clockwise direction, as indicated by the arrow in Figure 1, the excess metal is cut away from the buttons of metal in the casting recesses 9, this excess metal coming off in the form of a continuous shaving or strip 29 as indicated in Figures 1 and 2. A chute 30 is provided for the shavings of excess metal to fall upon and be guided into a bucket in which they may be collected to be subsequently re-melted.

In order to make the action of the cutter more effective and to keep the excess metal from lifting the button-like blanks out of the recesses 9, a pressure finger 31 is provided which bears against the top of the metal just in advance of the cutter, this finger being yieldably held down by means of a spring 32 and being supported on a fixed bracket 33. Also to resist this lifting tendency of the knife 27 the recesses 9 may have a slight upward taper, as shown in Figure 4, so as to be just slightly smaller at the top than at the bottom.

After the excess metal has been cut away from the top of the mold cavities, there remain in the pockets 9 individual detached buttons of metal, one button being provided in each recess. All of the dross that forms in the process of casting collects as a skin on the excess metal which is cut away so that each button is entirely clean on the top. Under some conditions there may be a lesser thickness of excess metal to be removed, in which case the buttons, instead of having the entire top surface cut away, would have only the high part of the top surface cut away, as explained in the first part of this specification in connection with Figs. 10 and 11.

For ejecting the buttons or slugs from the recesses 9 we have shown a sprocket wheel 34 carried on a bracket 35 positioned over the cut-away portion 4 of the casting table 3. The teeth of the sprocket wheel are spaced to enter the holes 9 and are of sufficient length to project into the holes 9 and push the slugs or buttons of metal, designated 36, out of their recesses, as clearly shown in Fig. 4, into a chute 39. The rotation of the casting ring 8 may be conveniently utilized to operate this toothed wheel, the disc 8 with its holes 9 serving as a driving gear.

It has been found, however, that where the toothed wheel is driven directly by engagement with the holes or recesses in the casting disc, as described, it tends to wear the edges of the mold cavities and to slightly mark the metal slugs. A simple way of avoiding this difficulty is to positively drive the ejecting wheel 34 by an arrangement such as that shown in Figures 6 and 7. In these figures corresponding reference numerals have been used to indicate the corresponding parts. The ejecting wheel 34, however, is mounted on a shaft 34' to which is secured a pinion 34a. This pinion meshes with an annular rack 34b secured directly to the casting disc or ring so as to rotate with this ring. The pinion 34a is thus driven upon the rotation of the cooling table and its motion is transmitted through the shaft 34' to the ejecting wheel 34.

From the foregoing description of the machine, the method of operation at once becomes clearly apparent. The metal flows continuously into the pockets of the continuously revolving casting disc 8; the freezing or solidification of the metal is accelerated by the circulation of water under the table 3; and after the metal has solidified the excess is shaved off the top and the individual buttons, free or substantially free of dross are ejected from the holes 9, falling onto the chute. These buttons may then be lubricated as is the usual practice, and subjected to the usual process of extrusion. Extrusion apparatus is shown in our prior Patent No. 1,646,854 and in the Davis Patent No. 1,515,383. Any such apparatus may be used. By reason of the fact that the dross is removed from either the entire top surface of the button or from that portion of the surface where it is objectionable, the loss by the formation of imperfect tubes due to the presence of dross is very considerably reduced. The machine has a considerable advantage over machines of the type disclosed in our prior Patent No. 1,646,854 in that there is no intermittent valve operation and no intermittent movement of the casting disc. Since the casting disc rotates continuously in the present machine, the valve remaining continuously open so long as the machine is operating, the production of a single machine is very enormously increased.

It will be understood, however, that the present method is also applicable to a machine of the type shown in Patent No. 1,646,854. This is illustrated, for instance, in Figure 9 wherein 40 designates an intermittently movable table, as disclosed in the prior patent, having casting recesses 41 therein with an ejector 42 in the bottom of each recess. The tops may be shaved off the blanks by the use of a knife as shown in Figure 1, or a continuously driven rotary cutter 43, as shown in Figure 9, may be used. This cutter bears against the top of the table and is continuously rotated through a shaft 44. The knives of the cutter moving across the tops of the blanks serve to remove the excess metal. The amount of excess metal removed is determined by the amount of excess metal which is poured into the mold. In view of the much speedier operation of the machine shown in Figures 1 to 8, inclusive, over a machine of the intermittent table type as shown in Figure 9, we obviously prefer to use the continuously moving casting ring type.

Since the excess metal which is shaved off in the practice of our invention is collected and can be dumped back into the melting pot and used over again, there is no appreciable loss of metal arising from the fact that the molds are filled to excess instead of being filled with the exact weight of metal necessary to form a tube, and the excess then shaved off. Because of the improved quality of the blanks due to the removal of the dross from that portion where it causes trouble, and due to the fact that the molds can be moved continuously instead of intermittently, the present invention offers considerable advantage over the formation of these slugs by previous methods.

While we have shown and described certain specific embodiments of our invention, it will be understood that various changes and modifications may be made therein. It will also be understood that a fixed knife may be used in place of the rotary cutter in Figure 9, or that a rotary cutter as shown in Figure 9 can be adapted for use with the apparatus shown in Figures 1 to 8, as it is not material how the excess metal is removed.

We claim:

1. A slug casting machine of the class described comprising a rotary carrier having a series of mold cavities therein, a pouring spout for discharging metal into the mold cavities, means for rotating the carrier, a cutter comprising an inclined knife bearing against the top of the carrier for shaving off excess metal from the slugs cast in the mold cavities and removing excess metal from the top of the carrier, and a pressure finger over the carrier located slightly in advance of the knife and cooperating therewith for keeping the knife from lifting the slugs out of the mold cavities.

2. A slug casting machine of the class described comprising a rotary carrier having a series of mold cavities therein, a pouring spout for discharging metal into the mold cavities, means for rotating the carrier, a cutter comprising an inclined knife bearing against the top of the carrier for shaving off excess metal from the slugs cast in the mold cavities and removing excess metal from the top of the carrier, a pressure finger over the carrier located slightly in advance of the knife and cooperating therewith for keeping the knife from lifting the slugs out of the mold cavities, the mold cavities in said carrier comprising holes passing completely therethrough, and a table over which the carrier moves for closing the bottoms of the holes, the holes being slightly larger at the bottom than at the top for also resisting the tendency of the knife to lift the slugs out of the mold.

3. A slug casting machine of the class described comprising a rotary carrier having a series of mold cavities therein, a pouring spout for discharging metal into the mold cavities, means for rotating the carrier, a cutter comprising an inclined knife bearing against the top of the carrier for shaving off excess metal from the slugs cast in the mold cavities and removing excess metal from the top of the carrier, a pressure finger over the carrier located slightly in advance of the knife and cooperating therewith for keeping the knife from lifting the slugs out of the mold cavities, the mold cavities in said carrier comprising holes passing completely therethrough, a table over which the carrier moves for closing the bottoms of the holes, the holes being slightly larger at the bottom than at the top for also resisting the tendency of the knife to lift the slugs out of the mold, said table having a cut-away portion between the knife and the pouring spout so arranged that when the mold cavities move over the cut-away portion the slugs therein are unsupported at the bottom, and means located over the carrier for pushing the slugs out of the mold cavities through this cut-away portion of the table.

4. A method of reducing the occurrence of imperfections such as pinholes in containers extruded from cast blanks, which includes the steps of molding the blanks and during the molding pouring sufficient metal above the mold to provide metal at the top of the mold substantially free of dross and removing the surface of the blank which cools out of contact with the walls of the mold wherein it is cast.

5. The method defined by claim 4 wherein the removal of the surface of the blank is effected while the body thereof remains in the mold.

6. The method defined by claim 4 characterized by the further step of subjecting the blank to extrusion to form a container.

7. In a method of avoiding imperfections such as pinholes in containers extruded from a cast blank, the steps including delivering molten metal to a moving blank mold and during the molding pouring sufficient metal above the mold to provide metal at the top of the mold substantially free of dross, progressively removing the surface of the blank which cools out of contact with the walls of the mold, while the body of the blank remains in the mold and continues to move, and ejecting the blank from the mold.

8. The method defined by claim 7 wherein the blank is extruded to form a container.

9. In a method of eliminating imperfections from the walls of containers extruded from a cast blank, the steps including pouring molten metal into a mold and until the mold is slightly overfilled and to a sufficient amount to provide metal above the mold substantially free of dross, removing the excess material after the blank has cooled, ejecting the blank from the mold, and extruding it into the form of a container.

WALTER T. DAVIS.
JOHN A. McGINNIS.